United States Patent
Hall et al.

(10) Patent No.: US 7,380,841 B2
(45) Date of Patent: Jun. 3, 2008

(54) HIGH PRESSURE CONNECTION

(76) Inventors: David R. Hall, 2185 S. Larsen Pkwy., Provo, UT (US) 84606; John V. Fernandez, 2185 S. Larsen, Provo, UT (US) 84606

(*) Notice: Subject to any disclaimer, the term of this patent is extended or adjusted under 35 U.S.C. 154(b) by 447 days.

(21) Appl. No.: 11/163,672

(22) Filed: Oct. 26, 2005

(65) Prior Publication Data

US 2007/0096465 A1    May 3, 2007

(51) Int. Cl.
*F16L 19/00*    (2006.01)
(52) U.S. Cl. ...................... 285/353; 285/281
(58) Field of Classification Search ........... 285/353, 285/281, 280, 278, 354
See application file for complete search history.

(56) References Cited

U.S. PATENT DOCUMENTS

| | | | |
|---|---|---|---|
| 2,926,935 A * | 3/1960 | La Marre | 285/280 |
| 3,695,642 A * | 10/1972 | DeWoody | 285/353 |
| 4,281,679 A * | 8/1981 | Stearns | 285/353 |
| 4,478,435 A * | 10/1984 | Cheshier et al. | 285/351 |
| 5,052,432 A * | 10/1991 | Vonalt et al. | 285/279 |
| 5,201,867 A | 4/1993 | Morszeck | |
| 5,639,095 A | 6/1997 | Rhode | |
| 6,056,327 A | 5/2000 | Bouldin | |
| 6,206,182 B1 | 3/2001 | Wilson | |
| 6,290,234 B1 | 9/2001 | Eberle | |
| 6,431,551 B1 * | 8/2002 | Fuse et al. | 277/390 |
| 6,561,337 B2 | 5/2003 | Takeda | |
| 6,739,757 B2 | 5/2004 | Kai | |
| 6,851,729 B2 * | 2/2005 | Gibson | 285/353 |
| 7,210,687 B2 * | 5/2007 | Takahashi | 277/348 |
| 7,314,209 B2 * | 1/2008 | Pierson | 285/305 |

* cited by examiner

*Primary Examiner*—David E Bochna
(74) *Attorney, Agent, or Firm*—Tyson J. Wilde

(57) ABSTRACT

A connection includes a first and second surface stationary with respect to one another and a primary seal and secondary seal are formed between the surfaces and a labyrinth redundant seal is formed between the first and second surfaces and intermediate the primary and secondary seals. A connection for sealing against pressure may also include a retainer disposed within a housing receptacle a conduit disposed within a bore of the retainer. A primary seal may be formed between the conduit and the receptacle and a secondary seal may be formed between the retainer and the receptacle. A labyrinth seal may be formed between the retainer and the receptacle and intermediate the primary and secondary seals.

12 Claims, 15 Drawing Sheets

HIGH PRESSURE CONNECTION

BACKGROUND OF THE INVENTION

The present invention relates to high pressure connections. More particularly the present invention relates to high pressure connections comprising redundant seals. Downhole pressure in drilling, production, and geothermal applications may reach 25,000 PSI and temperatures over 200 degrees Celsius. It may be desirable for wires and other forms of transmitting data in such applications to have robust connections to downhole tools. It may also be desirable for hydraulic or pneumatic systems to have connections capable of withstanding high pressures. Other factors such as thermal expansion, vibrations from actuating tools, and stresses on downhole tools help contribute to a need for a robust high pressure connection.

U.S. Pat. No. 6,056,327 to Bouldin, et al. discloses a high pressure connector for engagement with a hydraulic conduit for use in high pressure conditions. A housing for receiving a conduit end is attachable to a primary retainer. A primary seal and a second seal are positioned between the primary retainer and the housing to provide redundant sealing capabilities. A secondary retainer holds a third seal against the primary retainer. The third seal provides redundant sealing capabilities and further provides a secondary gripping connection along the conduit length. The secondary gripping connection provides greater tensile strength and reduces the impact of conduit vibrations. A test apparatus may be adapted to test the primary, secondary, and other seals before the connector is installed downhole in the well or other high pressure environments. The '327 patent is herein incorporated by reference for all that it discloses.

U.S. Pat. No. 5,639,095 to Rhode discloses labyrinth seal systems with selected sealing surfaces and seal geometry to optimize flow deflection and produce maximum turbulent action. Improved convex surfaces, annular flow reversal grooves, flow deflection blocks and roughs, and machined surfaces cooperate to enhance the performance of the labyrinth seal systems. The '095 patent is herein incorporated by reference for all that it discloses.

U.S. Pat. No. 6,739,757 discloses a bearing unit comprising a bearing having an inner ring, an outer ring and a plurality of rolling elements arranged so as to be freely rotatable between the inner ring and the outer ring, and a sealing device arranged on axially opposite sides of the bearings, wherein the sealing device has a fixed spacer, a rotating spacer, and a non-contacting seal section attached to the rotating ring spacer and extending towards the fixed ring spacer to be maintained in a non-contacting condition with respect to the fixed ring spacer. The '757 patent is herein incorporated by reference for all that it discloses.

U.S. Pat. No. 6,561,337 discloses a seal for sealing between the inner ring and outer ring of a clutch release bearing comprising a labyrinth seal section extending from one of the inner ring and outer ring and kept in a non-contact state with reference to the other ring, and a contact seal section comprising a lip portion and provided on the internal side of the labyrinth seal and kept in a contact state with reference to the other ring, and the lip portion acting to obstruct semi-fluidized foreign matter which enters through the labyrinth seal. The '337 patent is herein incorporated by reference for that it discloses.

U.S. Pat. No. 6,290,234 discloses a sealed, rotatable shaft assembly including a housing that defines a bore that extends from an area exterior to the housing to an area interior to the housing. A shaft is rotatably disposed in the housing about an axis of the bore. The shaft extends through the bore between the interior area and the exterior area. An annular lip seal is disposed in the bore and is attached to one of the shaft and the housing. The lip seal extends from the one of the shaft and the housing to the other of the shaft and the housing in a contact seal so that rotation of the shaft with respect to the housing wears the lip seal to form a zero-clearance non-contacting seal. A labyrinth seal stage extends between the shaft and the housing. The labyrinth seal stage is disposed outward of the lip seal, with respect to the interior area and in communication with the lip seal.

U.S. Pat. No. 6,206,182 discloses an idler roller assembly for a belt conveyor including a fixed shaft, a roller mounted for rotation about the shaft, and a housing mounted in each end of the roller for rotation therewith. The shaft has a hub portion adjacent each end which hub portion is disposed adjacent the housing. A bearing has an inner race secured to the shaft and an outer race secured to the housing. A unitary co-injected annular seal having a first labyrinth seal portion and a contact seal portion composed of a different material than the first labyrinth seal portion is provided between the bearing and hub portions. The contact seal portion is preferably resiliently deformable and is less rigid than the first labyrinth seal portion. A second labyrinth seal portion cooperates with the first labyrinth seal portion to define a labyrinth passageway which is sealed by the contact seal. The '182 patent in herein incorporated by reference for all that it discloses.

U.S. Pat. No. 5,201,867 discloses a photoequipment bag consisting of a universally open container part having a dividable inner space and a closing part unilaterally hinged to the container part. The walls of the container part and of the closing part are provided each with a waterproof plastic layer. The plastic layer of the container part is watertightly connected to a first frame portion confining the container aperture, while the plastic layer of the closing part is watertightly connected to the second frame portion locking the closing part. The locking means engage the frame portions and the latter, in locked condition, are in engagement via a combined labyrinth and contact seal. The '867 patent is herein incorporated by reference for all that it.

BRIEF SUMMARY OF THE INVENTION

It may be desirable for wireline cables or network data transmitting medium in downhole environments to have high pressure connections to their respective downhole tools. It may also be desirable for downhole tools connected in data transmitting systems, hydraulic systems, or pneumatic systems to have high pressure connections with redundant seals. Redundant seals may be desirable in downhole applications utilizing downhole mud hammers because a constant change in pressure may be created by the vibrations of the downhole hammer. A redundant seal may compensate for a primary seal overload during a high pressure peak. Typically, the narrower the connection the easier it is to affix conduits or cables to or within the downhole tool, since the tool typically has limited space to accommodate connections.

The present invention is a connection for use in pressure with a first and second surface stationary with respect to one another and a primary seal and secondary seal formed between the surfaces. Also a redundant labyrinth seal is formed between the first and second surfaces and intermediate the primary and secondary seals. The labyrinth seal may comprise grooves formed in the first or second surface. The first surface may be a retainer and the second surface may be a receptacle or a conduit. The labyrinth seal may allow for narrower connections, since traditional redundant seal components may be bulky.

In some embodiments of the invention the connection includes a retainer disposed within a housing receptacle and a conduit is disposed within a bore of the retainer. A primary seal is formed between the conduit and the receptacle and a secondary seal is formed between the retainer and the receptacle, or the secondary seal is formed between the conduit and the retainer. A labyrinth seal may be formed between the primary and secondary seal. The labyrinth seal may be formed between the conduit and the retainer or between the retainer and the housing receptacle. The labyrinth seal may have a plurality of bristles or segments. The labyrinth seal may be a fluid path comprising a plurality of sharp turns. Preferably, a cavity, which is formed by the surfaces, the primary seal and the secondary seal, is pressurized by a fluid. Pressurizing the cavity may help determine is a seal is properly assembled and may dissipate fluid velocity that may overcome the primary or secondary seals.

The present invention may include a thread connection between a first threadform in the retainer and a second threadform in the housing receptacle. The threaded connection may be intermediate the primary seal and the labyrinth seal or intermediate the secondary seal and the labyrinth seal. The primary and secondary seals may comprise elastomeric material, ceramics, metal to metal seals, O-rings, metal O-rings, rubber, C-seals, T-seals, pressurized metal contacts, ferrules, and combinations thereof. A biasing element may be used in conjunction with a metal O-ring to form a primary or secondary seal.

The retainer may also comprise a secondary receptacle and a secondary retainer coaxially intermediate the conduit and the secondary receptacle. The present invention may also include a threaded connection between the secondary retainer and the secondary receptacle. A third seal may be formed between the between the secondary retainer and the secondary receptacle. In some aspects of the present invention, the third seal may also seal against the conduit. A fourth seal may be formed between the secondary retainer and the conduit. The secondary retainer may comprise a pressurization port which may be a threadform adapted to receive a pressurization apparatus. A second labyrinth redundant seal may be formed between the conduit and the retainer and be intermediate the third and primary seal.

The labyrinth redundant seal may be useful for many applications. The conduit may provide a liquid, gas or a cable passage for use in downhole environments. Applications for a connection including a labyrinth redundant seal include downhole tools, drilling hammers, drilling jars, hydraulic systems, drill bit assemblies, pipes, plugs, jack hammers, vibrators, bulkheads, satellites, conduit connectors, and pumps.

It should be noted that a "surface" is defined by the Merriam-Webster Online Dictionary as "the exterior or upper boundary of an object or body." It should also be noted that a "seal" is defined by the 5$^{th}$ Edition of the McGraw-Hill Dictionary of Scientific and Technical Terms as "any device or system that creates a nonleaking union between two mechanical or process-system elements." It should also be noted that a "primary seal" is defined for purposes of this specification as "the first seal encountered by a leak path."

DETAILED DESCRIPTION OF THE INVENTION AND THE PREFERRED EMBODIMENT

Figure 1:
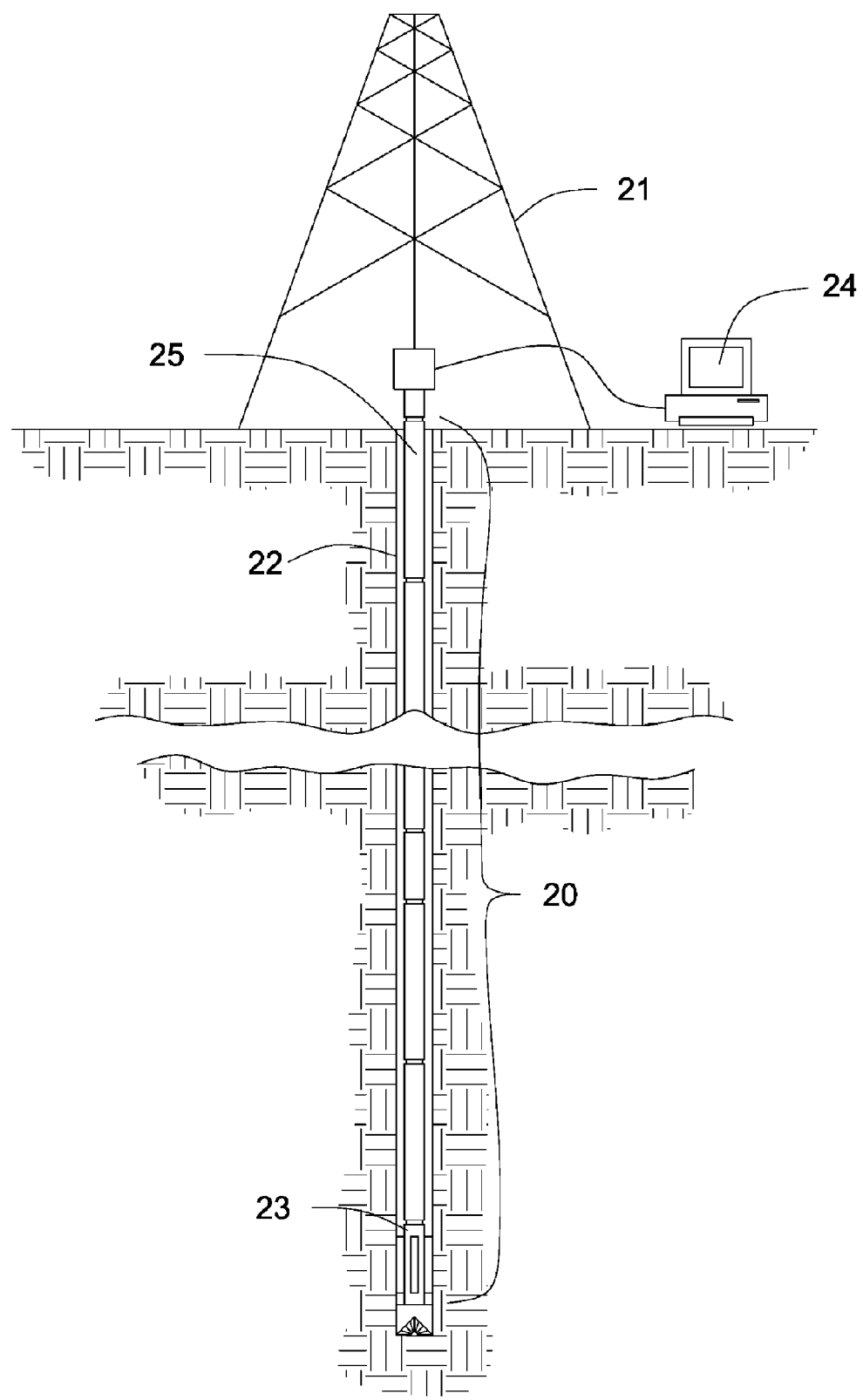
FIG. 1 is a perspective view of an embodiment of a drill string suspended within a drilling bore.

FIG. 1 shows a perspective view of a drill string 20 suspended within a drilling bore 22. A derrick 21 supports the drill string 20. Downhole tools 23, such as drilling hammers, drilling jars, sensors, drill bits, and other tools may be attached to the drill string 20. If a downhole transmission system is incorporated within the drill string 20, such as a downhole network, data may be transmitted to surface equipment 24 for real time analysis. Such systems may include those systems disclosed in U.S. Pat. No. 6,670,880 to Hall; U.S. Pat. No. 6,641,434 to Boyle; and U.S. Pat. No. 6,688,396 to Floerke; all of which are herein incorporated by reference for all that they disclose. Downhole tools 23 connected to an electrically conducting wireline (not shown) may also allow data to be transmitted to surface equipment 24 for analysis. The drill string 20 may comprises components 25 selected from the group consisting of coiled tubing, drill pipe, drill collars, heavyweight pipe, stabilizers, reamers, subs, kellies, links, hammers, and jars. In alternative embodiments, other downhole tool strings may be used such as a production well or a geothermal well.

Figure 2:
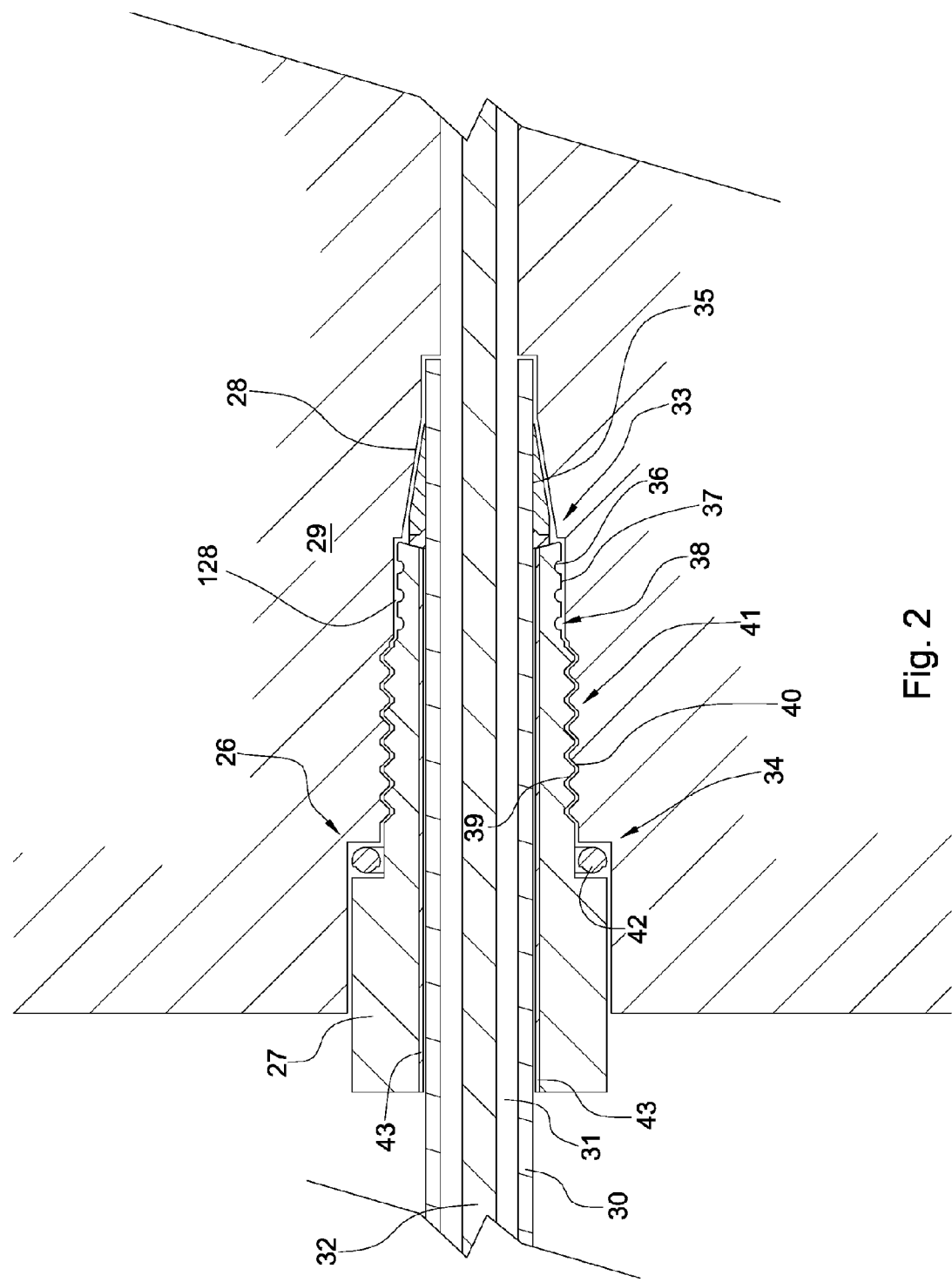
FIG. 2 is a cross sectional view of an embodiment of a connection.

FIG. 2 shows an embodiment of the present invention. The connection 26 creates redundant seals for use in harsh environments. The connection 26 comprises a first and second surface 37, 128; where the first surface 37 is part of a retainer 27 and the second surface 128 is part of a housing receptacle 28. The first and second surfaces 37, 128 are stationary with respect to one another. The retainer 27 is disposed within a housing receptacle 28. The housing 29 may be a drilling hammer, a drill bit body, a drilling jar, or other downhole tools; however, this type of connection may be used in other applications besides downhole drilling. In alternative embodiments the housing 29 may be parts of hydraulic systems, plugs, jack hammers, vibrators, bulkheads, satellites, other outer space applications, conduit connecters, or pumps.

A conduit 30 is disposed within a bore 31 of the retainer 27. The conduit 30 may be a passage for cables 32, fluids, or gases. A primary seal 33 is formed between the conduit 30 and the housing receptacle 28, and a secondary seal 34 is formed between the retainer 27 and the housing receptacle 28. Preferably, the primary seal 33 comprises a ferrule 35 and is adjacent a labyrinth redundant seal. A labyrinth seal 38 may comprise a plurality of grooves 36 formed in the surface 37 of the retainer 27. The grooves 36 may be generally U-shaped, generally rectangle shaped, or generally triangular shaped. A communication path 74 (shown in FIG. 4) connects the grooves 36 creating a torturous fluid path 55 (also shown in FIG. 4). After the retainer 27 is inserted within the housing receptacle 28, a cavity formed by the retainer, the receptacle, and the surfaces may be energized. If a fluid velocity were to overcome either the primary seal or the secondary seal, the grooves 36 may dissipate the fluid velocity thereby creating the labyrinth seal 38. Since the labyrinth seal 38 in FIG. 2 is a groove 36 formed in the retainer 27, the labyrinth seal 38 provides a narrow high pressure redundant seal, which may be used in downhole tools 23 comprising a limited amount of space for a connection able to withstand high pressures.

The retainer 27 may comprise a first threadform 39 and the housing receptacle 28 may comprises a cooperating second threadform 40, forming a threaded connection 41. The threaded connection 41 may be intermediate the labyrinth seal 38 and the secondary seal 34, or intermediate the labyrinth seal 38 and the primary seal 33. The threaded connection 41 may be straight as shown in FIG. 2, or it may comprise a taper. It is believed that a tapered threaded connection (not shown) may create a mechanical seal useful for providing another seal. At least one of the seals 33, 34 may be selected from the group consisting of elastomeric materials, ceramics, O-rings, metal O-rings 42, rubbers, C-seals, T-seals, pressurized metal contacts, ferrules, and combinations thereof. The secondary seal 34 may be a single O-ring, a single metal O-ring, a metal O-ring and a elastomeric O-ring, a metal O-ring and multiple elastomeric metal O-rings, a metal O-ring and a ferrule, a metal O-ring and a backup or another combination of seals referred to in this specification.

In downhole and other environments, the connection 26 may be subjected to corrosive conditions such as corrosive fluids or galvanic corrosion. Preferably, at least part of the connection 26 comprises a corrosion resistant coating 43 made of a material such as a silver compound; however, the coatings 43 may be selected from the group consisting of nickel, phosphorous, gold, sliver, copper, tungsten, tin, aluminum, cobalt, zinc, chromium, brass, mixtures thereof, alloys thereof, and combinations thereof. The corrosion resistant coating 43 may cover at least a portion of the connection 26 such as retainers, receptacles, housings, seals, grooves, jam nuts, biasing elements, surfaces, and conduits.

Figure 3:
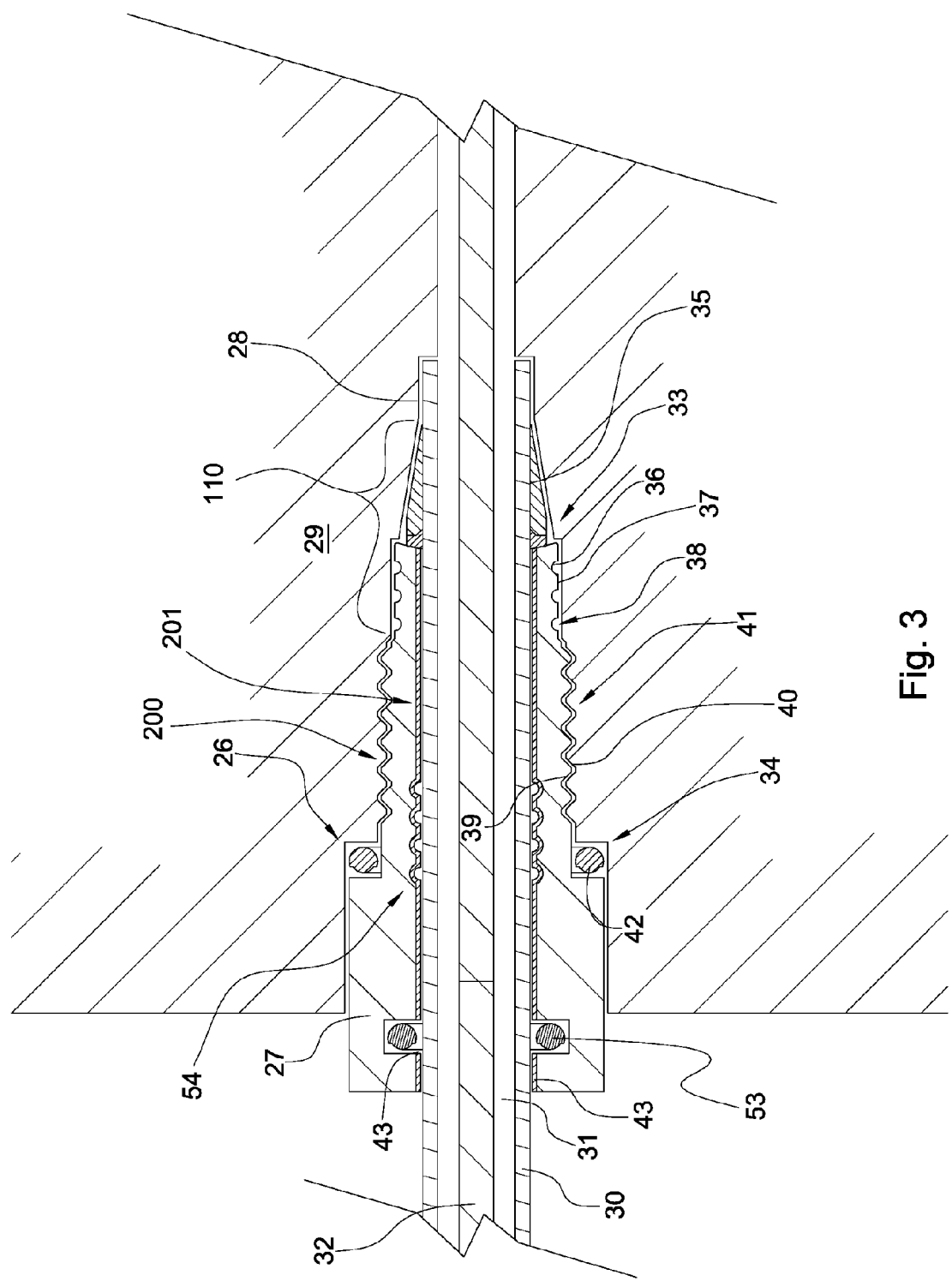
FIG. 3 is a cross sectional view of another embodiment of a connection.

FIG. 3 is a cross section of the connection comprising another secondary seal 53. A second labyrinth redundant seal 54 is formed between the primary seal 33 and the other secondary seal 53. Preferably, the second secondary seal 53 is made of an elastomeric material, where the first secondary seal 34 is made of a metal O-ring. A leak path exists along the interface 200 between the retainer 27 and the receptacle 28 and another leak path exists along the interface 201 between the conduit 30 and retainer 27. The first and second labyrinth seals 38, 54 provide the connection 26 with two sets 110, 120 of redundant labyrinth seals (see FIG. 7); one for each leak path. The other secondary seal 53 may also be useful for providing grip along the conduit 30.

Figure 4:
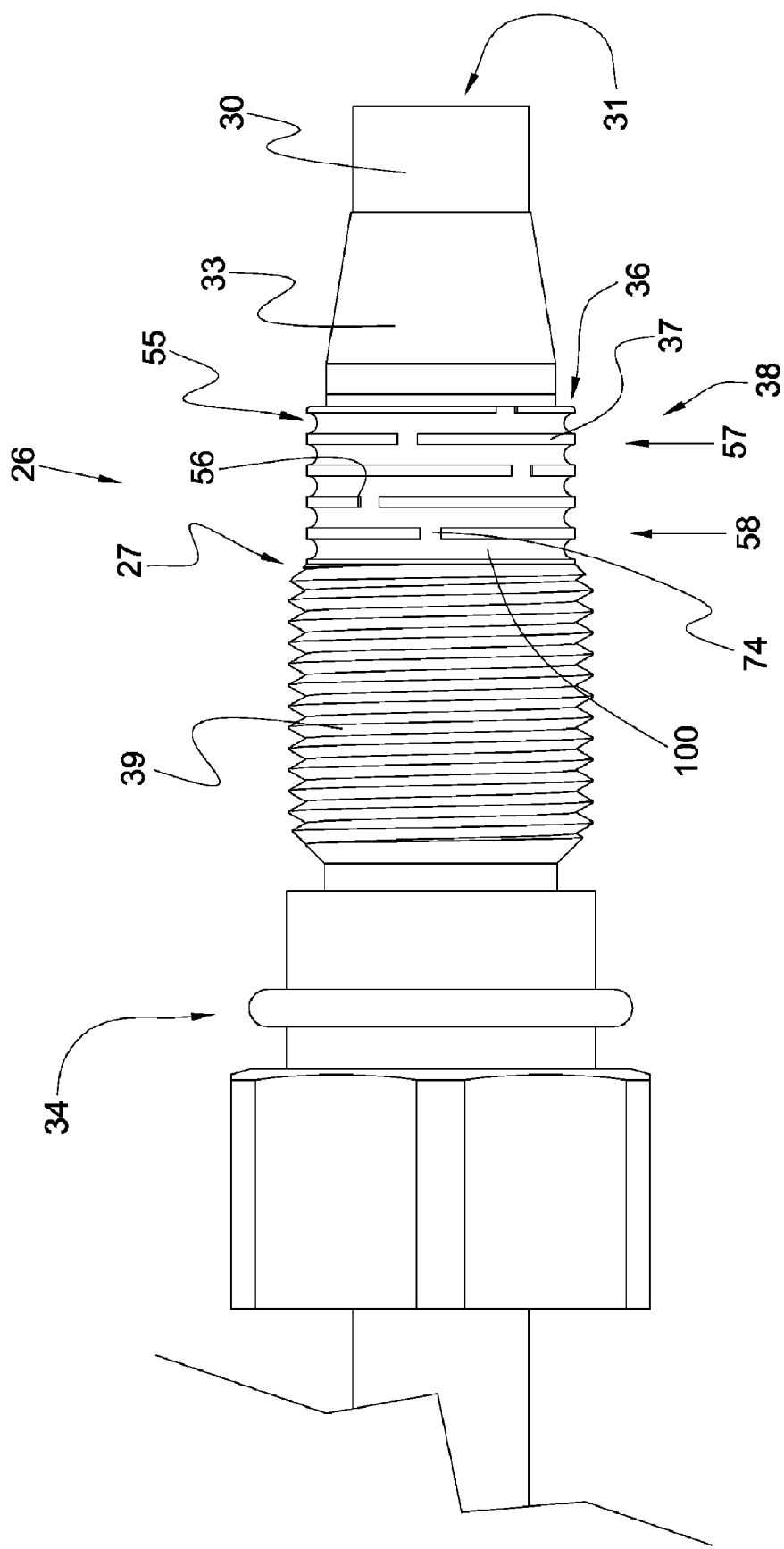
FIG. 4 is a perspective view of another embodiment of a connection.

FIG. 4 is a perspective view of the connection 26. The conduit 30 is disposed through the bore 31 of the retainer 27 and the first threadform 39 is between the primary and secondary seal 33, 34. A plurality of axial grooves 36 is adjacent the primary seal 33 and forms a torturous fluid path 55 comprising a plurality of fluid communication paths 74 creating sharp turns 56. The grooves 36 as shown in FIG. 4 are substantially larger than is preferred for an actual connection 20, but the grooves 36 are shown proportionally large for purposes of illustration. It is believed that as fluid enters the labyrinth 38 the fluid velocity pressure drops at each sharp turn 56 creating a lower pressure zone because the velocity pressure is converted to other forms of energy, such as heat and acoustic energy. It is believed that a shorter communication path 74 is more effective for reducing the pressure; therefore it may be more preferable for the grooves 36 to be very close together. A first portion 57 of the fluid path 55 adjacent the primary seal 33 may experience higher fluid velocity pressure than a second portion 58 of the fluid path 55 which is further away from the primary seal 33, because of the pressure drops created by the sharp turns 56, such that the fluid velocity pressure is zero at the end 100 of the labyrinth 38; thereby creating a fluid seal. This type of redundant seal 110, 120 (see FIGS. 3 & 7) may be particularly useful in applications where the connection 26 experiences peaks of pressure, such as created by downhole drilling jars, downhole drilling hammers, drill bits cutting away a portion of the earth, and jack hammers. The grooves 36 may be formed by a grinding wheel, a lathe, or a milling machine.

Figure 5:
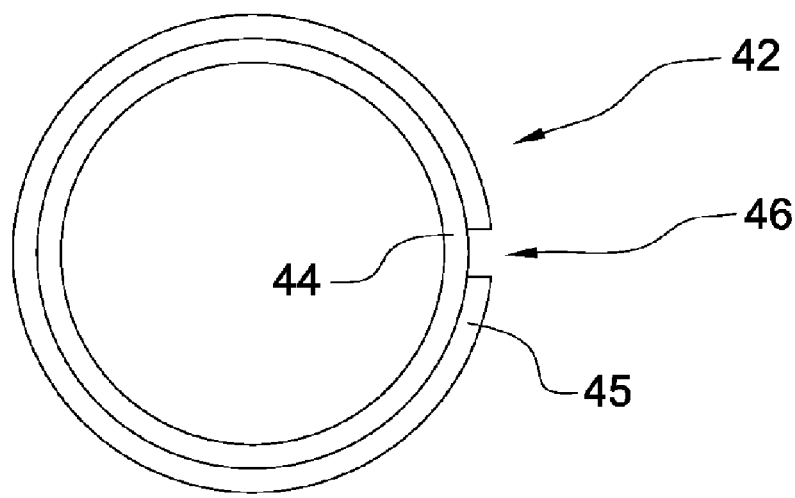
FIG. 5 is a cross sectional view of an embodiment of a metal O-ring.
Figure 6:
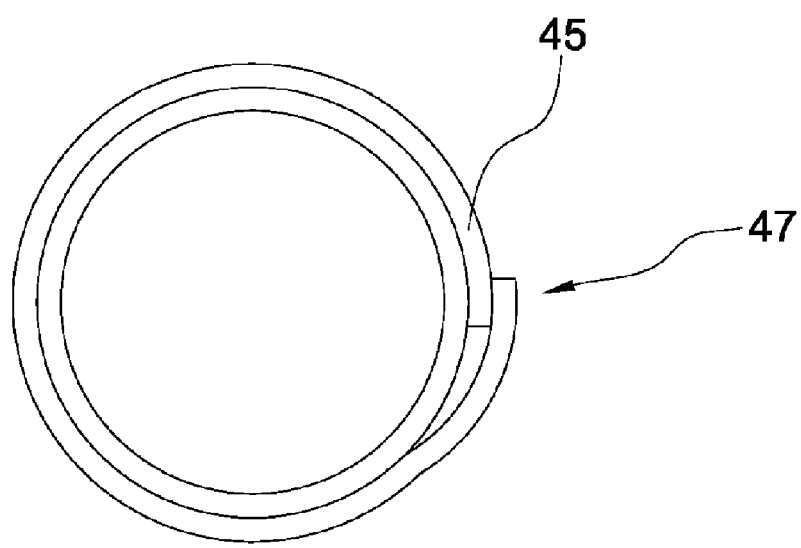
FIG. 6 is a cross sectional view of another embodiment of a metal O-ring.

FIG. 5 shows a cross sectional view of a metal O-ring 42. Preferably, the metal O-ring 42 is used as the secondary seal 34 and comprises a spring 44 and a flexible shield 45. The flexible shield 45 may flex when the metal O-ring 42 is under compression. The shield 45 may comprise a gap to accommodate for the flexing. A preferred metal O-ring (number H308903 RWNC) may be purchase from Garlock Helicoflex, located in Columbia, S.C. An alternative embodiment is shown in FIG. 6. The shield 45 comprises an overlap 47 to accommodate for the flexing.

Figure 7:
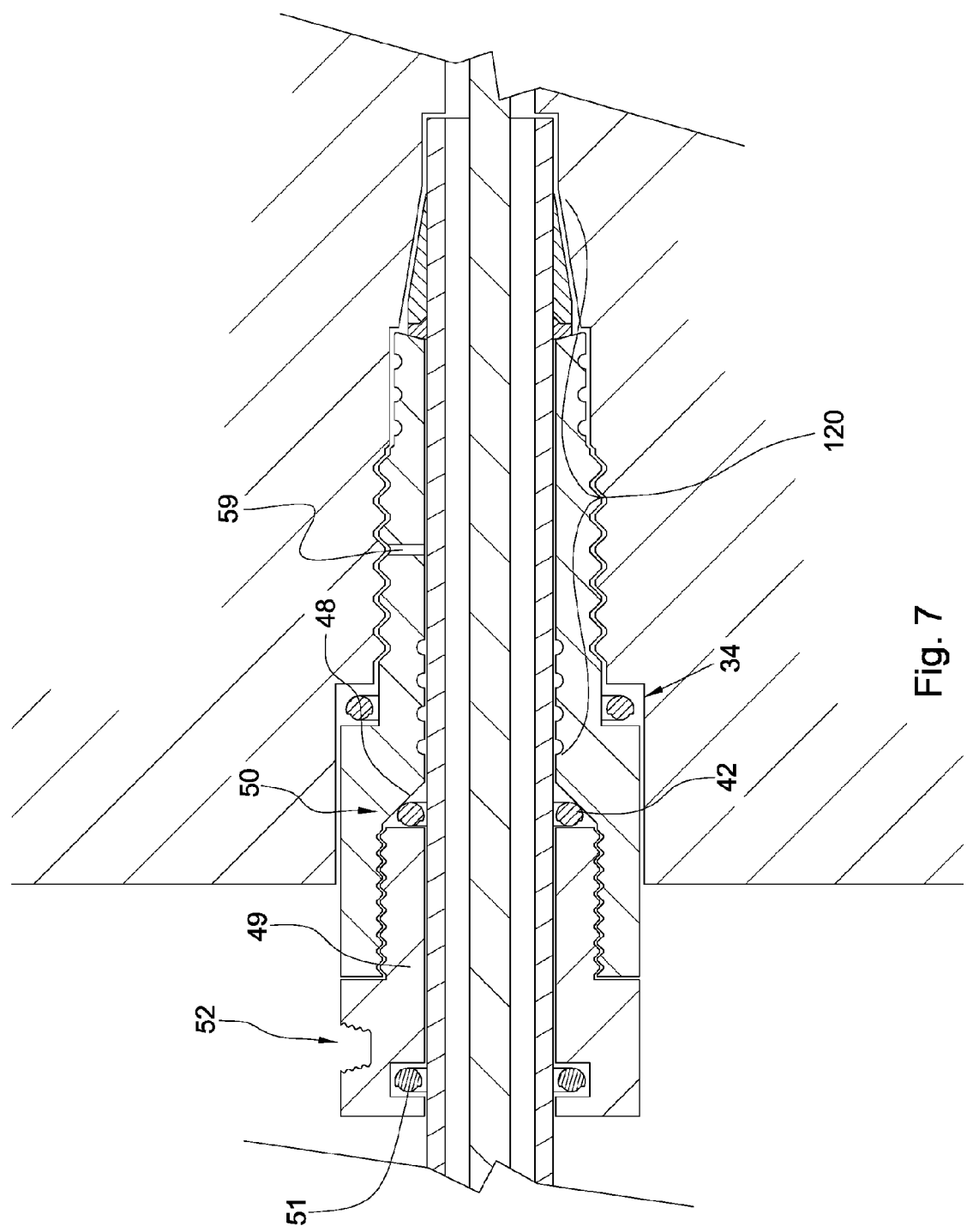
FIG. 7 is a cross sectional view of the preferred embodiment of a connection which comprises a secondary retainer.

FIG. 7 is a cross sectional view of the preferred embodiment of the connection 26 further comprising a secondary receptacle 48 and a secondary retainer 49 disposed within the secondary receptacle 48. A third seal 50 is formed between the secondary retainer 49 and the secondary receptacle 48. Further a fourth seal 51 may be formed between the conduit 30 and the secondary retainer 49. The fourth seal 51 may help provide gripping along the conduit 30. Preferably, the third seal 50 is a metal O-ring 42 and the fourth seal 51 is made of an elastomeric material. A pressurization port 52 is formed in the secondary retainer 49. It would be obvious to one of ordinary skill in the art to add as many retainers as needed to gain a desired affect.

When testing the seals 33, 34, 51 the secondary retainer 49 may be threaded in enough to bias metal O-ring 42 to form a seal 50 between the secondary retainer 49 and the secondary receptacle 48, but not form a seal against the conduit 30. This allows for pressure provided by the pressurization apparatus (not shown) to travel past the third seal 50 and into a pressure port 59. The pressure port 59 opens between the primary and secondary seals 33, 34. The pressure provided by the pressurization apparatus is also experienced by the fourth seal 51. A pressurization apparatus may be purchased from Parker Hannifin Corporation located in Columbus, Ohio. The connection 26 is usually tested before the connection 26 is introduced into a downhole environment. If testing shows that the primary, secondary, and fourth seals 33, 34, 51 are secure then the secondary retainer 49 is advanced further into the secondary receptacle 49 such that the third seal 50 forms against the conduit 30.

Figure 8:
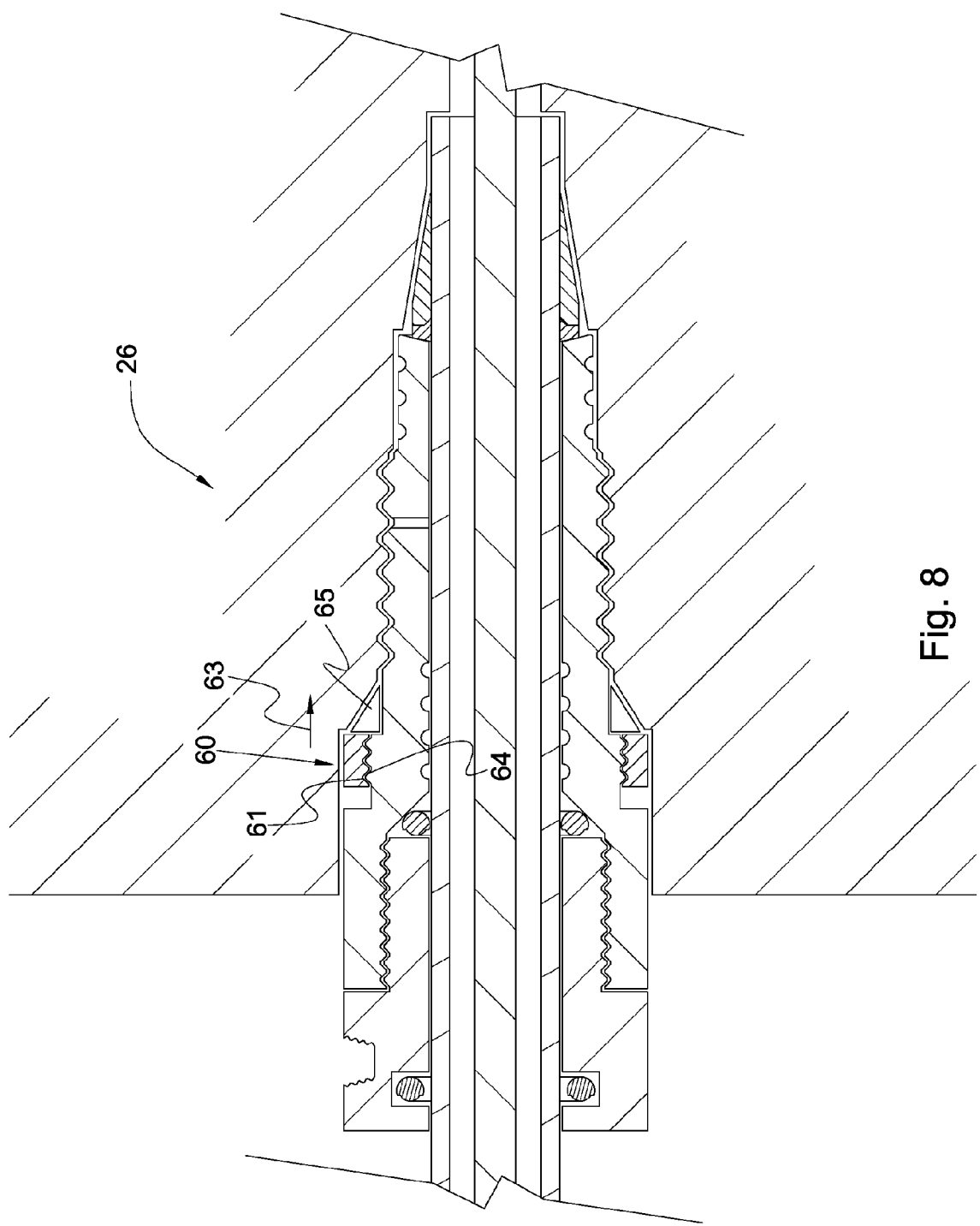
FIG. 8 is a cross sectional view of an embodiment of a connection comprising a biasing element.

FIG. 8 is a cross sectional view of the connection 26 comprising a biasing element 60. The biasing element 60 may be a compression ring 62 comprising a threadform 61 which cooperates with a threadform 64 formed in the retainer 27. A biasing force 63 may be adjusted by tightening or loosening the compression ring 62. The ring 62 may push against a ferrule 65 and form a secondary seal 34.

Figure 9:
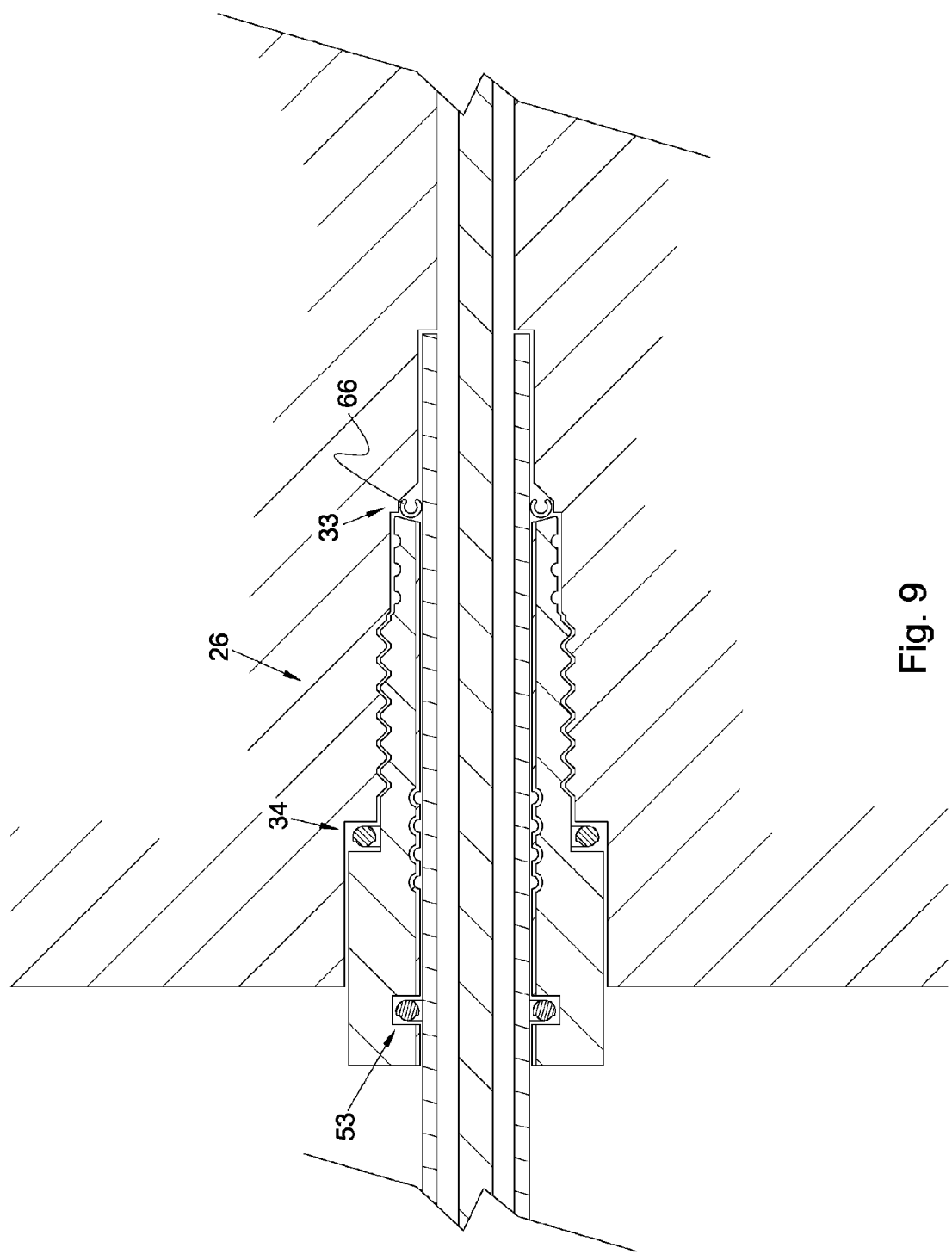
FIG. 9 is a cross sectional view of an embodiment of a connection comprising a C-seal.

FIG. 9 is a cross sectional view of a connection 26 comprising a C-seal 66 to form a primary seal 33. A C-seal may also be purchased from Garlock Helicoflex, located in Columbia, S.C. A C-seal may be used to form any of the seals 33, 34, 53. Further, a C-seal 66 may be used to form a third and fourth seal 50, 51 (shown in FIG. 7).

Figure 10:
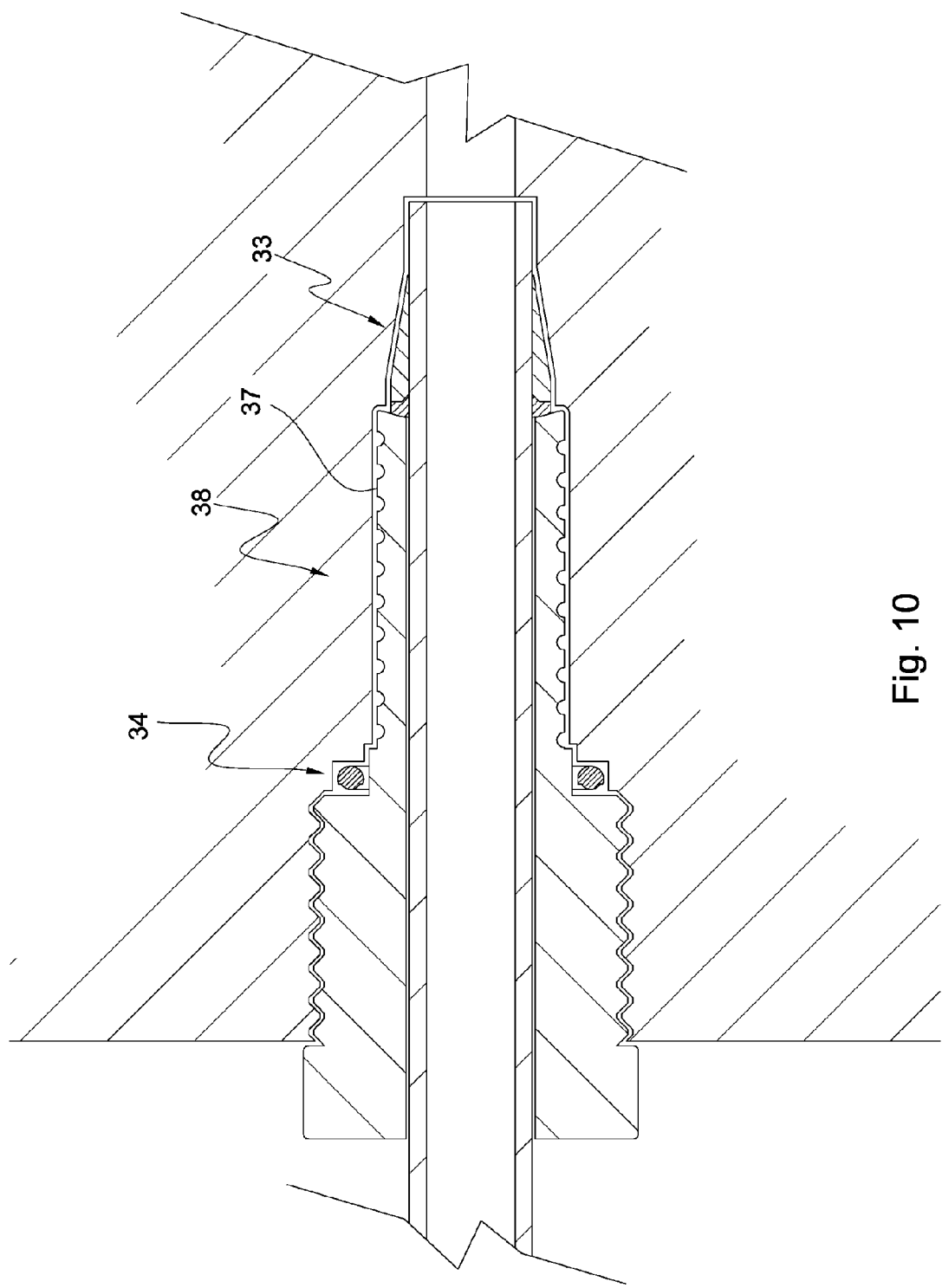
FIG. 10 is a cross sectional view of another embodiment of a connection.
Figure 11:
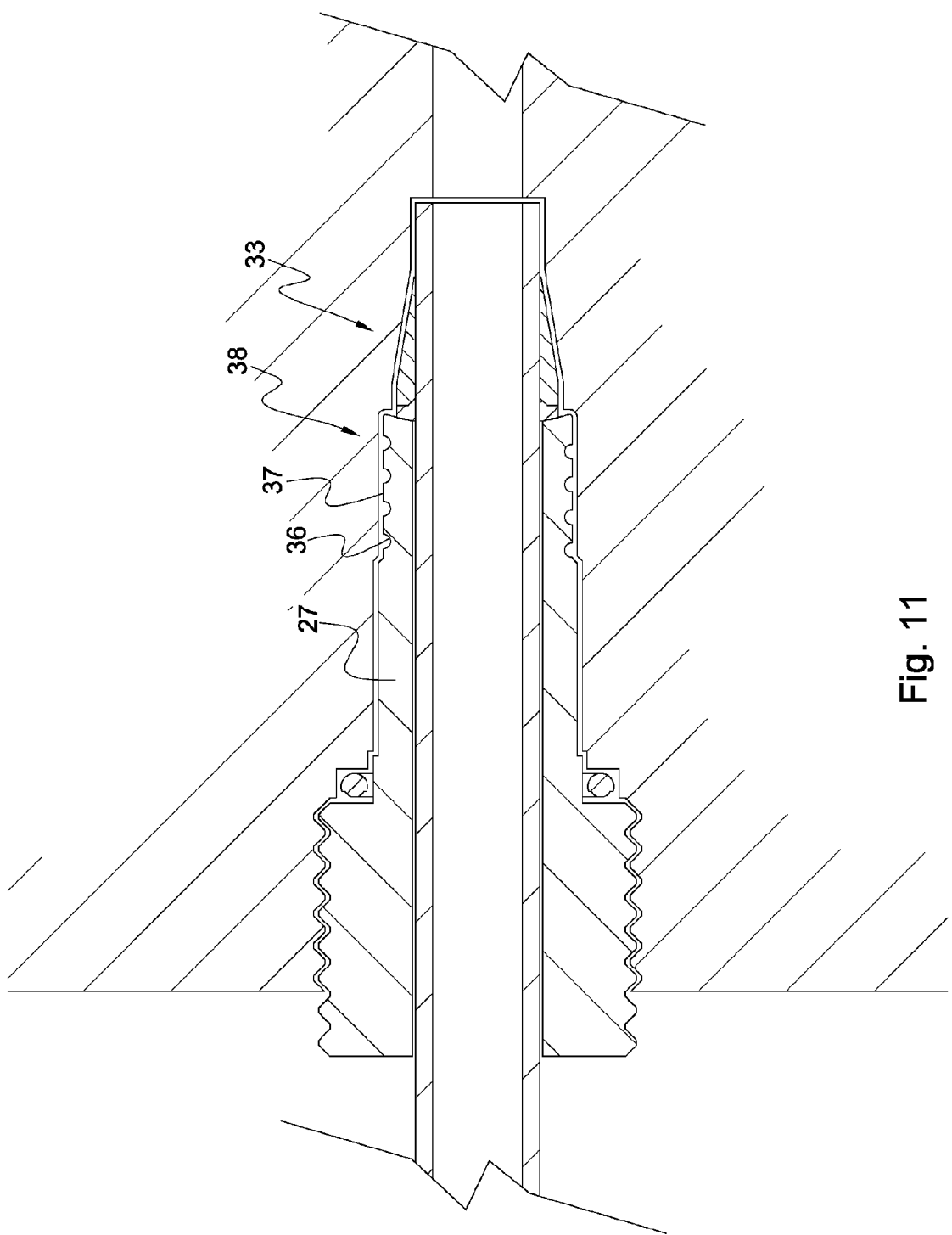
FIG. 11 is a cross sectional view of another embodiment of a connection.

FIG. 10 provides a cross sectional view of a labyrinth seal 38 comprising a plurality of grooves 36 formed in the surface 37 of the retainer 27. The grooves 36 create a fluid path in communication with both the primary and secondary seals 33, 34. FIG. 11 shows a labyrinth seal 38 comprising grooves 36 formed in the surface 37 of the retainer 27. The grooves 36 are only adjacent to the primary seal 33. In other embodiments (not shown), the grooves 36 may be only adjacent to the secondary seal 34.

Figure 12:
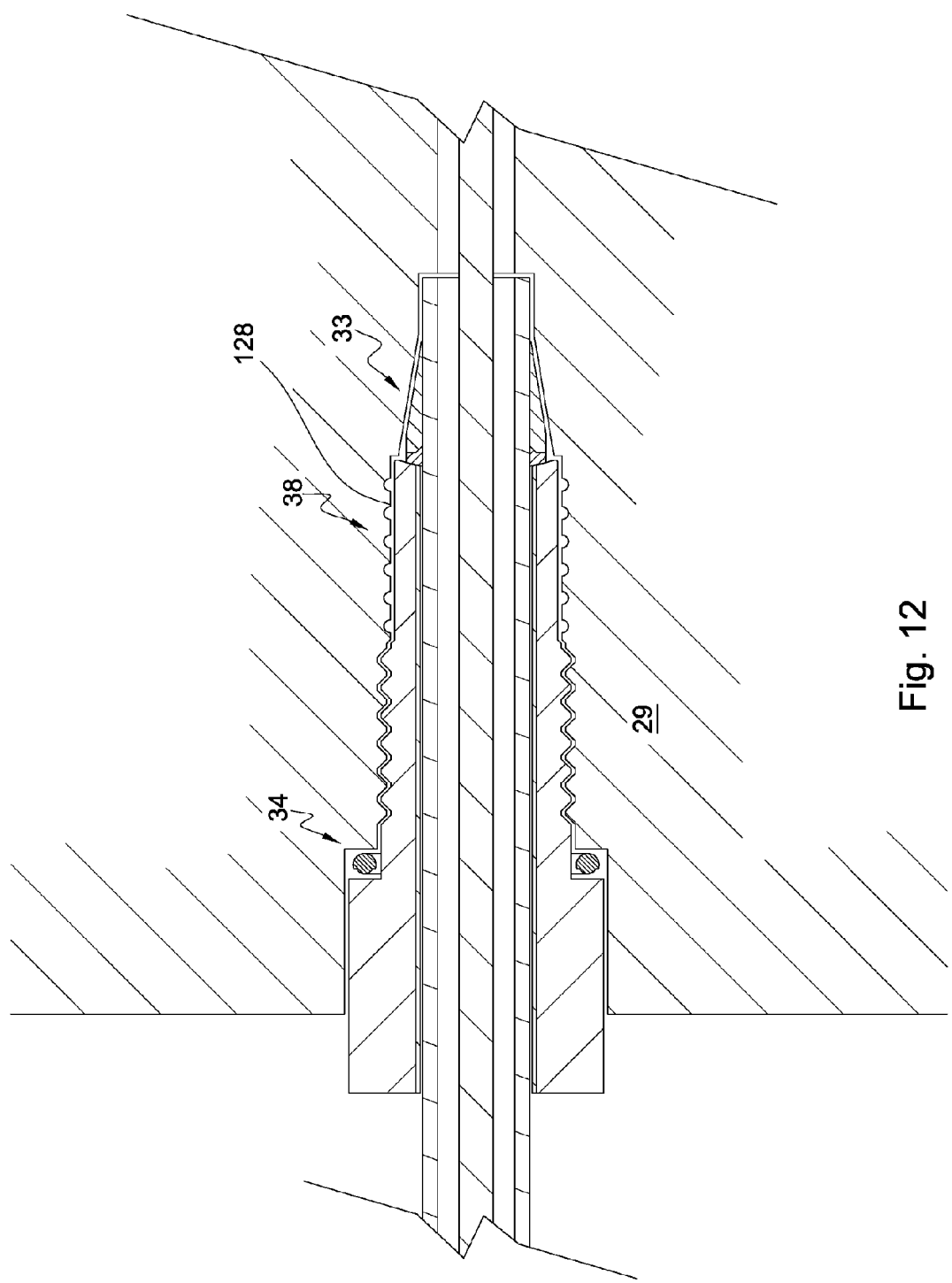
FIG. 12 is a cross sectional view of an embodiment of a labyrinth seal formed in a receptacle housing.

FIG. 12 provides a cross sectional view of a labyrinth seal 38 formed in the surface 128 of the receptacle housing 29. Such a labyrinth seal 38 may be formed by milling or grinding the plurality of grooves 36 in the receptacle housing 28. A lathe may also be used to form the grooves 36. The plurality of grooves 36 may be adjacent the primary seal 33, the secondary seal 34, or both.

Figure 13:
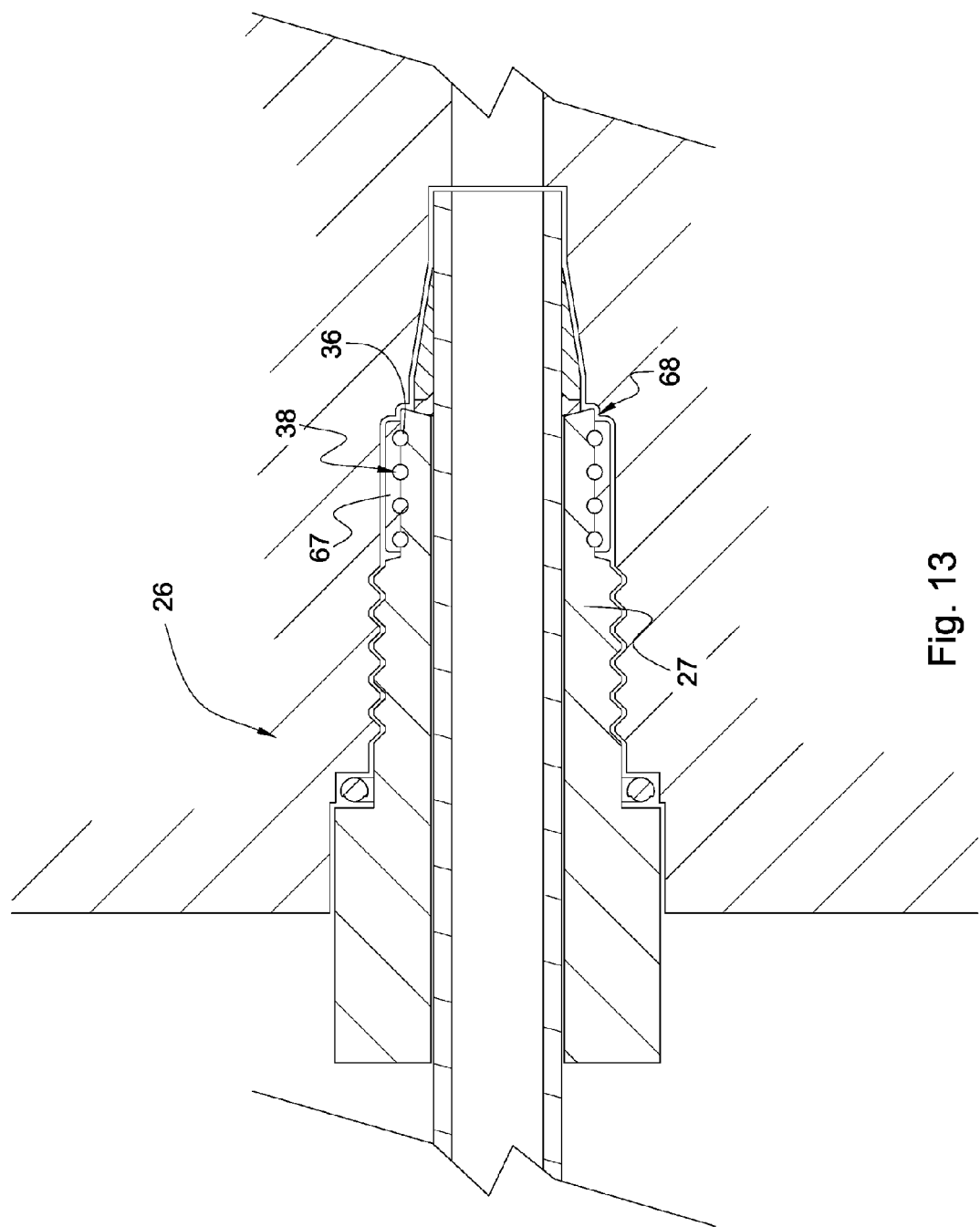
FIG. 13 is a cross sectional view of an embodiment of a labyrinth seal in the connection.
Figure 14:
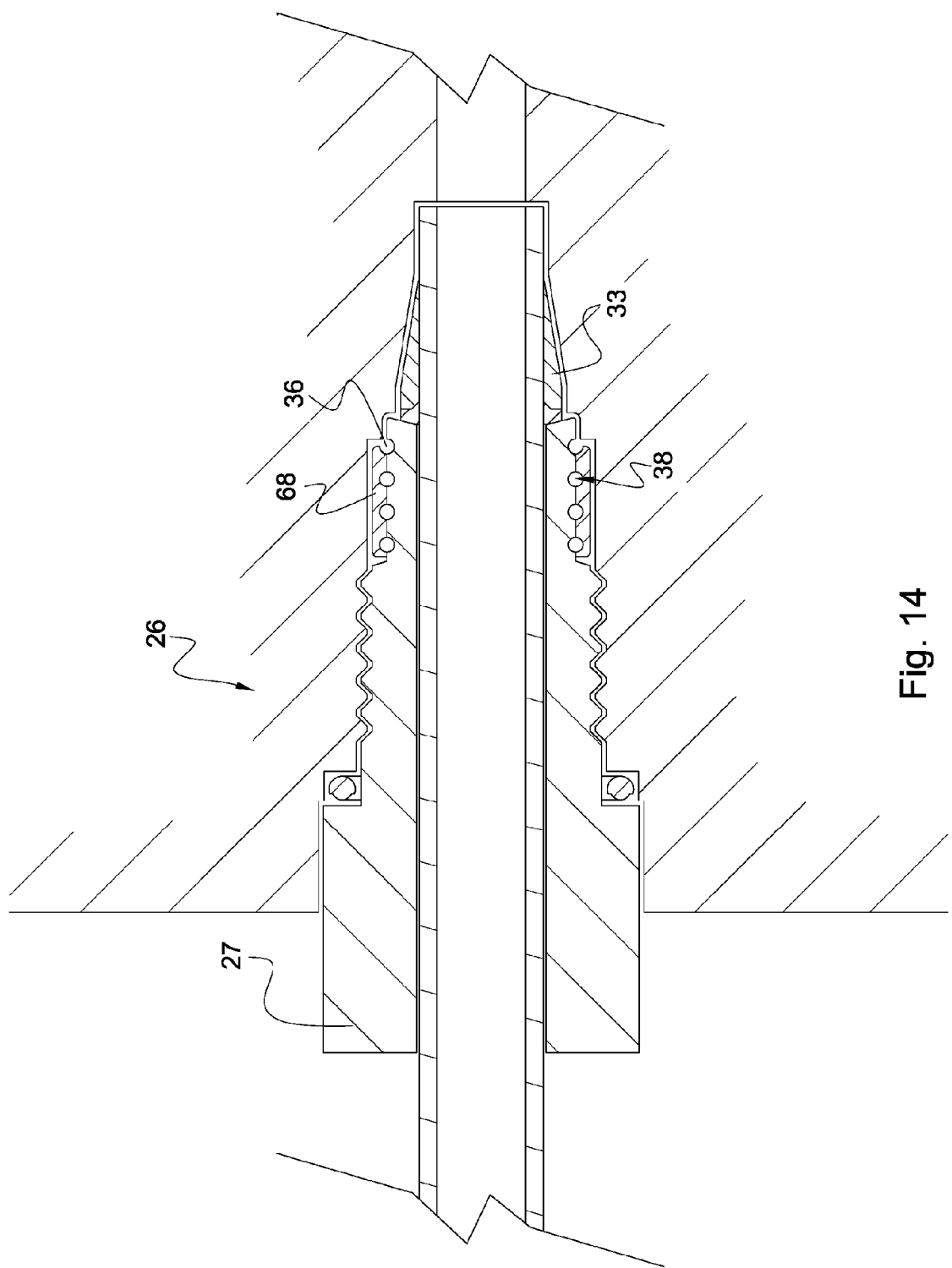
FIG. 14 is a cross sectional view of another embodiment of a labyrinth seal formed in a connection.

FIG. 13 is a cross sectional view of a labyrinth seal 38. A plurality of grooves 36 are formed in the retainer 27 and a cooperating grooved ring 67 form the labyrinth seal 38. A communication path 74 (shown in FIG. 4) may be formed in either the grooved ring 67 or in the retainer 27 to provide the sharp turns 56 (see FIG. 4) and provide the torturous fluid path 55. FIG. 13 also shows that a mechanical seal 68 is formed intermediate the primary seal 33 and the labyrinth seal 38. The mechanical seal 68 may contribute to the ability of the connection 26 to withstand high pressure. FIG. 14 is a cross sectional view of the connection 26 comprising a grooved ring 67 cooperating to form a labyrinth seal 38, similar to that shown in FIG. 13. The plurality of grooves 36 is in communication with the primary seal 33 and no mechanical seal 68 is intermediate the labyrinth seal 38 and the primary seal 33.

Figure 15:
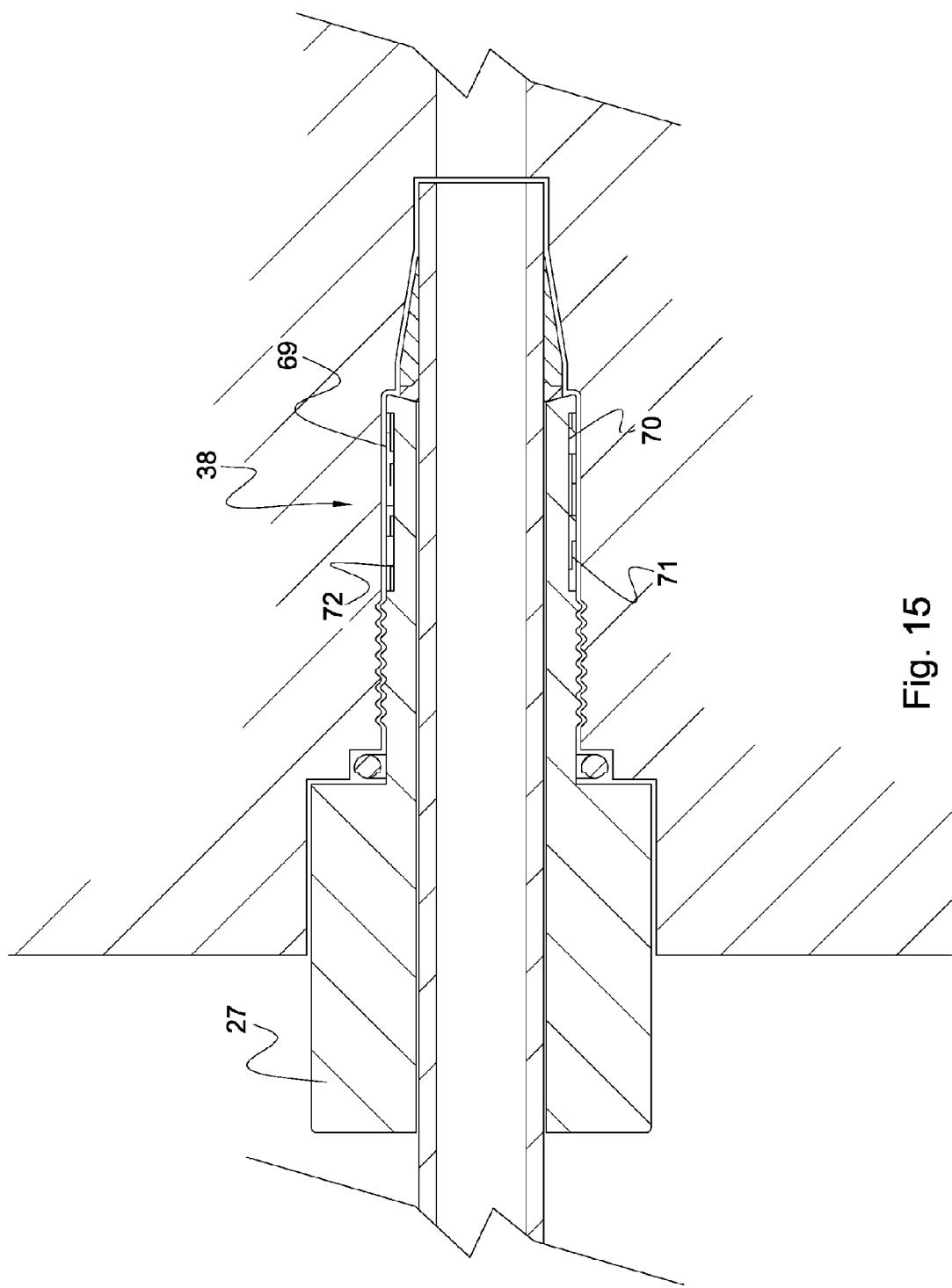
FIG. 15 is a cross sectional view of an embodiment of a labyrinth seal comprising a plurality of segments.

FIG. 15 provides a cross sectional view of a labyrinth seal 38 comprising a plurality of segments 69. The interfaces 70 between the segments 69 create a torturous fluid path 71 with sharp turns 72, which causes pressure drops just like the grooves 36 formed in the retainer 27 (see FIG. 4). Such segments 69 may be segments of an annular ring. Alternatively, a recess (not shown) may be formed in the retainer 27, and the segments 69 may be disposed within the recess. Further a recess (not shown) may be formed in the housing receptacle 29 and the segments 69 may be placed within that recess, and provide a torturous fluid path within the housing receptacle 29.

Figure 16:
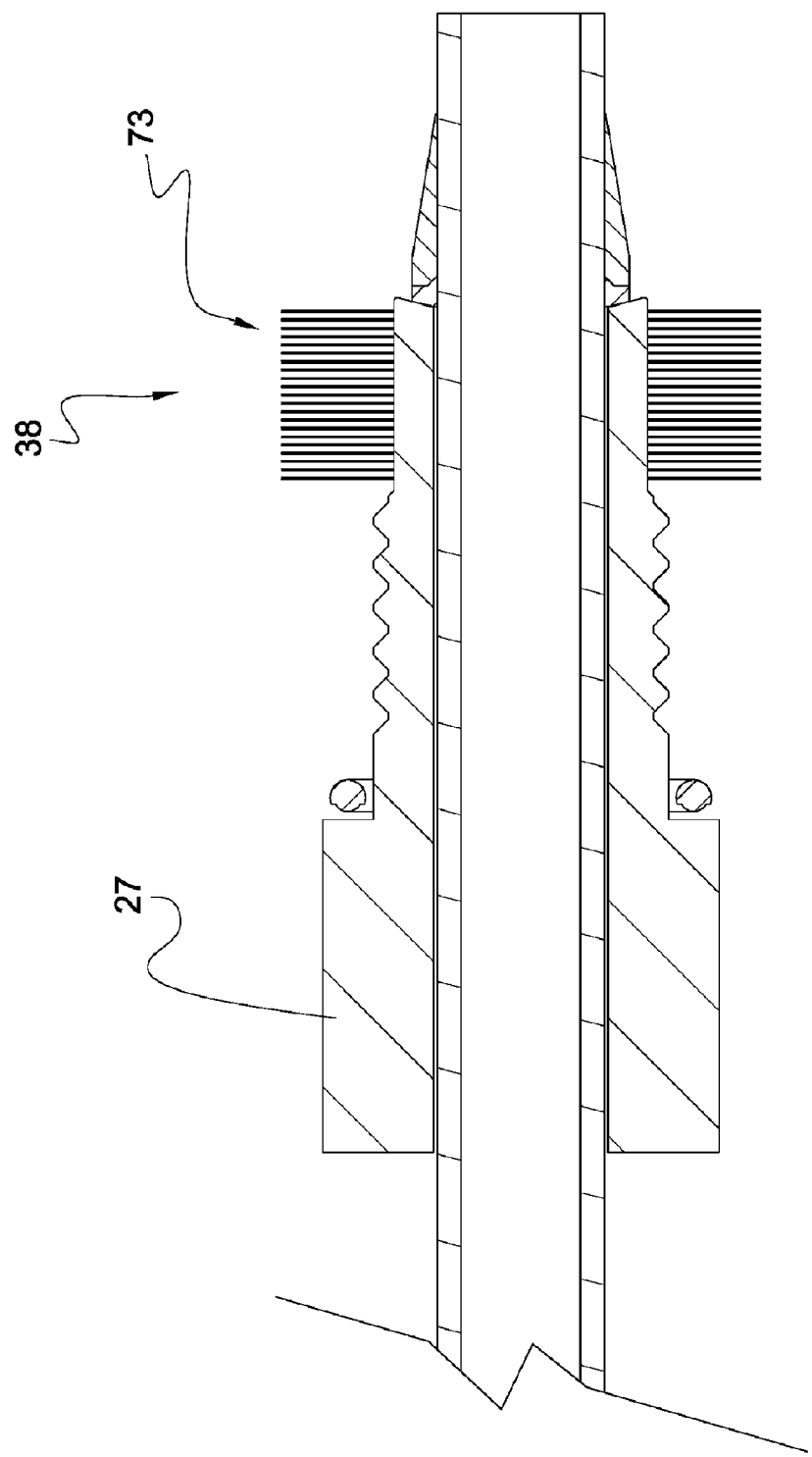
FIG. 16 is a cross sectional view of an embodiment of a labyrinth seal comprising a plurality of bristles.

FIG. 16 is a cross sectional view of a retainer 27 comprising a plurality of bristles 73. The bristles 73 ought to be packed closely together. When the retainer 27 is inserted into the housing receptacle 28 (see FIG. 2), the bristles 73 conform to the receptacle housing 28. Small gaps (not shown) between the bristles 73 are formed which create a torturous fluid path with a plurality of sharps bends, thus creating a labyrinth seal 38.

Whereas the present invention has been described in particular relation to the drawings attached hereto, it should be understood that other and further modifications apart from those shown or suggested herein, may be made within the scope and spirit of the present invention.

What is claimed is:

1. A connection, comprising:
   a retainer disposed within a housing receptacle;
   a conduit disposed within a bore of the retainer;
   a primary seal formed between the conduit and the receptacle;
   a secondary seal formed between the retainer and the receptacle; and
   a labyrinth seal between the retainer and the receptacle and intermediate the primary and secondary seals;
   wherein the connection further comprises a threaded connection between the retainer and the housing receptacle.

2. The connection of claim 1, wherein a cavity is formed by the retainer, the housing, the primary seal, and the secondary seal and wherein the cavity is pressurized with a fluid.

3. The connection of claim 1, wherein the labyrinth seal is formed in the retainer surface, formed in the receptacle surface, formed by a plurality of bristles, or formed by a plurality of segments.

4. The connection of claim 1, wherein at least one of the seals is selected from the group consisting of elastomeric materials, ceramics, O-rings, metal O-rings, rubber, C-seals, T- seals, pressurized metal contacts, ferrules, and combinations thereof.

5. The connection of claim 1, wherein retainer comprises a secondary receptacle and a secondary retainer is coaxially intermediate the conduit and the secondary receptacle.

6. The connection of claim 5, wherein the secondary retainer and secondary receptacle comprise a mechanical threaded connection.

7. The connection of claim 5, wherein a third seal is formed between the secondary retainer and the secondary receptacle and seals against the conduit.

8. The connection of claim 7, wherein a second labyrinth seal is formed between the conduit and the retainer and intermediate the third seal and the primary seal.

9. The connection of claim 5, wherein the secondary retainer comprises a pressurization port.

10. The connection of claim 5, wherein a fourth seal is formed between the secondary retainer and the conduit.

11. The connection of claim 1, wherein the housing receptacle is located within a housing selected from the group consisting of downhole tools, drilling hammers, drilling jars, hydraulic systems, plugs, jack hammers, drill bit assemblies, vibrators, bulkheads, satellites, conduit connectors, and pumps.

12. The connection of claim 1, wherein wherein the conduit is a cable passage, a gas passage or a fluid passage.

* * * * *